United States Patent [19]

Florent

[11] Patent Number: 5,406,501
[45] Date of Patent: Apr. 11, 1995

[54] METHOD AND DEVICE FOR USE IN DETECTING MOVING TARGETS

[75] Inventor: Raoul Florent, Lillers, France

[73] Assignee: U.S. Philips Corporation, New York, N.Y.

[21] Appl. No.: 226,442

[22] Filed: Apr. 12, 1994

Related U.S. Application Data

[63] Continuation of Ser. No. 810,743, Dec. 18, 1991, abandoned.

[30] Foreign Application Priority Data

Dec. 21, 1990 [FR] France ................... 90 16108

[51] Int. Cl.$^6$ ............................ G06K 9/38; G06K 9/20
[52] U.S. Cl. ........................................ 364/516; 348/169; 348/172; 348/699; 382/48; 382/50; 382/58
[58] Field of Search ................. 364/516; 348/169, 172, 348/699; 382/48, 58, 50

[56] References Cited

U.S. PATENT DOCUMENTS

5,109,435  4/1992  Lo et al. ............................ 358/105 X
5,166,788  12/1992  Lee ........................................ 358/105

OTHER PUBLICATIONS

N. C. Mohanty; Computer tracking of moving point targets in space; IEEE Trans. PAMI; vol. 3 No. 5; pp. 606–611, 1981.

D. J. Fleet et al.; "Hierarchical construction of orientation and velocity selective filters"; IEEE Trans. PAMI; vol. II No. 3, pp. 315–325 1989.

G. R. Legters et al; "A Mathematical model for computers image tracking"; IEEE Tran. PAMI, vol. 6, No. 6, Nov. 1982 pp. 583–594.

V. S. S. Hwang; "Tracking feature points in time-varying images using an opportunistic selection approach" IEEE, Tran.

Pattern Recognition. vol. 22, No. 3, 1989 pp. 247–256.

I. K. Sethi: "Finding trajectories of Feature points in a monocular image sequence"; IEEE Trans. PAMI, vol. PAMI-9, No. 1 Jan. 1987 pp. 56–73.

Casasent et al., "Subpixel Target Detection And Tracking", SPIE, vol. 726, Intelligent Robots and Computer Visions: Fifth in a Series (1986), pp. 206–220.

*Primary Examiner*—Emanuel T. Voeltz
*Assistant Examiner*—Kamini Shah
*Attorney, Agent, or Firm*—Richard A. Weiss

[57] ABSTRACT

A method and device for use in detecting moving targets in a scene represented by a sequence of mutually registered images R ( . . . , $R_{n-1}$, $R_n$, $R_{n+1}$, . . . ) over time wherein differential images D ( . . . , $D_{n-1}$, $D_n$, $D_{n+1}$, . . . ) are derived from succeeding images R, and spatially low pass filtered to obtain a sequence of filtered differential images F ( . . . , $F_{n-1}$, $F_n$, $D_{n+1}$, . . . ). For each pixel of a plurality of pixels (i,j) and for each of a plurality of directions ($d_x$,$d_y$), a sum of intensities is formed from a number of successive frames of the sequence of filtered differential images $F_{n-m}$ (m=0,1 . . . M) at pixel locations ($i+md_x$,$j+md_y$) located, as the image is further back in time, along the direction progressively outwards from the pixel. For each pixel of the plurality of pixels, an intensities is determined which represents for the maximum size among the sums among the plurality of directions, the intensity for each pixel collectively forming an image $G_n$.

13 Claims, 2 Drawing Sheets

METHOD AND DEVICE FOR USE IN DETECTING MOVING TARGETS

This is a continuation of application Ser. No. 07/810,743, filed Dec. 18, 1991, now abandoned.

FIELD OF THE INVENTION

The invention relates to a method for use in detecting non-point targets moving in a scene represented by a sequence of mutually registered images R. The invention is used, for example, in monitoring road traffic by means of an infrared camera.

One of the objects of the invention is to provide a tool for detecting resolved objects. Resolved objects are objects having a size of several pixels moving in a sequence of pictures taken by, for example, a movable infrared camera.

BACKGROUND OF THE INVENTION

It is a known fact that an image is a collection of pixels and that each pixel has a certain grey level encoded over a certain number of bits. If, for example, encoding of grey levels is effected over 8 bits, the grey levels can assumed any value between 0 and 255. It is assumed (hereinafter) that the value 255 corresponds to a bright pixel and the value 0 to a black pixel.

It will be noted that the detection of motion in a sequence of images implies that there is a difference between two consecutive images, such that the movable portions and the stationary portions become apparent. In a broad and general manner, it is known from the prior art, from the publication by CASASENT, Sub-pixel Target Detection and Tracking, SPIE, Vol. 726, 1986, to deal with detection in image processing by splitting the procedure into two steps:

(a) an extraction step; and
(b) a tracking or validation step involving motion filtering.

From the prior art, a filtering method is known, for example, which includes the step of thresholding the difference between two images, in which consequently one single differential image is used, followed by a path tracking procedure. It appears that after a simple extraction, one is induced to take a binary decision.

In addition, from the publication of the prior art, by N. C. MOHANTY, Computer Tracking of Moving Point Targets in Space, Trans. PAMI, Vol. 3, no. 5, 606–611, 1981, three-dimensional linear filtering methods are known using large supports. Filters of that type have the property of allowing the total preservation of the data as it regards the grey levels. However, the volume of preserved data is very large, and the calculations required by a method including this type of filtration are absolutely enormous. This type of method is consequently only applicable to very small images.

The working context of the above-mentioned methods involve a number of problems. In the first place, the images are beset with noise, i.e., the differential image contains contributions due to noise which might give the impression that there are moving objects or targets.

In the second place, the images must be registered. This is achieved automatically when the camera recording the images to be processed is immobile. When the camera is mobile, for example, it is mounted on a moving vehicle, or it is mounted on a mast which Sways in the wind, the recorded images must be registered relative to the other images in such a manner that the background, for example, appears stationary in the sequence of images. This re-adjustment is effected in a manner known per set, which consequently does not form part of the invention. But it has been found that the re-adjustment procedure is not always perfect. It generally leads to registration errors of the order of one pixel, which means that between consecutive images, systematic errors of the order of one pixel appear in the coincidence of corresponding portions of the images. This results in a differential image in which the contribution of these registration errors is noticeable, and thus may be taken for moving objects. It is, on the other hand, also possible that in the registration procedure significant occasional errors appear which extend over a non-negligible portion of consecutive images in the image sequence. The contribution of these occasional errors, due to the registration procedure, also form an error source in the detection of slow moving targets.

In the third place, among the targets which may appear in the images, there are a certain number of targets which one does not want to detect, for example, swaying trees or moving clouds, or background portions subjected to variations in the illumination. In accordance with that fact, but contrary to those targets, one of the objects of the invention is the detection of moving objects having relatively continuous and relatively regular paths.

SUMMARY OF THE INVENTION

One of the objects of the invention is to provide a detection method which obviates the drawbacks of the two prior art methods, namely use of a simple differential image and the three-dimensional filtering on large supports.

Another object of the invention is to provide a motion detection device capable of detecting less bright moving objects and to do so with a low false alarm rate. The results of this extraction device are intended for a path tracking algorithm.

It is, therefore, still another object of the invention to provide a detection device having an improved detection rate and less probabilities of false alarms compared with the prior art, with the object of obtaining a high grade detection.

A further object of the invention is to provide a detection device of a sufficiently simple structure to allow real time implementation. More specifically, the number of storage planes required, and also the required calculation time must be reasonable.

It is, therefore, still a further object of the invention to provide an extraction method which is sufficiently economical as regards calculation time to allow a real-time or quasi real-time implementation, capable of being applied to adequately large images, for example, having a size of 512×512 pixels, whose detection rate and false alarm possibility are sufficiently satisfactory to result in a high grade detection.

According to the invention, these objects are achieved by means of a method for detecting moving targets from a scene represented by a sequence of mutually registered images R ( . . . , $R_{n-1}$, $R_n$, $R_{n+1}$, . . . ) over time, the method including the steps of (a) deriving differential images D ( . . . , $D_{n-1}$, $D_n$, $D_{n+1}$, . . . ) from succeeding images R;
(b) spatially low pass filtering the differential images D to obtain a sequence of filtered differential images F( . . . , $F_{n-1}$, $F_n$, $F_{n+1}$ . . . ), (c) for each pixel from a plurality of pixels (i,j) and for each of a plurality of directions ($d_x$,$d_y$), forming a sum of intensities from a number of successive images of the sequence of filtered differential images $F_{n-m}$, where m ranging from 0 to M, at pixel locations (i+m$d_x$, j+m$d_y$) located, as the image is further back in time, along the direction progressively outwards from the pixel; and (d) for each pixel of the plurality of pixels, determining an intensity representative for the maximum size among the sums among the plurality of directions, the intensities for each pixel collectively forming an image $G_n$.

This method provides for both spatial and temporal summing. Spatial summing through spatial low pass filtering, and temporal (possibly weighted) summing from pixel locations radiating from the pixel along the path that must be followed by a moving target reaching the pixel along some direction with a constant speed. By emphasizing the maximum among the sums occurring in the various directions, signal to noise ratio due to noise form other directions is more reduced.

This method provides for images in which linearly moving targets are emphasized over noise. It combines information from several images without requiring explicit identification of the targets. Consequently, no information needs to be discarded due to erroneous identification or erroneous lack of it.

It has been found that the method works well even with advantageously simple operations. For example, the maximum among the sums may be emphasized simply by taking the maximum sum as an output value. The low pass filtering can be implemented with a linear filter with finite support, for example, by summing regions of 3×3 pixels to obtain pixels of the filtered image. The differential image may be obtained simply by subtracting corresponding pixels from pairs of registered images, optionally followed by a step for turning them into positive values. For further detection of moving targets, the images may be thresholded.

A device for implementing the method according to the invention is advantageous because it only works with images, of which it needs to store only a few, and need not identify targets as such explicitly.

These and other advantageous aspects of the invention will be apparent and elucidated with reference to the embodiments described hereinafter.

BRIEF DESCRIPTION OF THE DRAWINGS

The invention and how it can be put into effect will now be described in detail with reference to the accompanying drawings, wherein.

DETAILED DESCRIPTION OF THE INVENTION

First Stage

Figure 1:
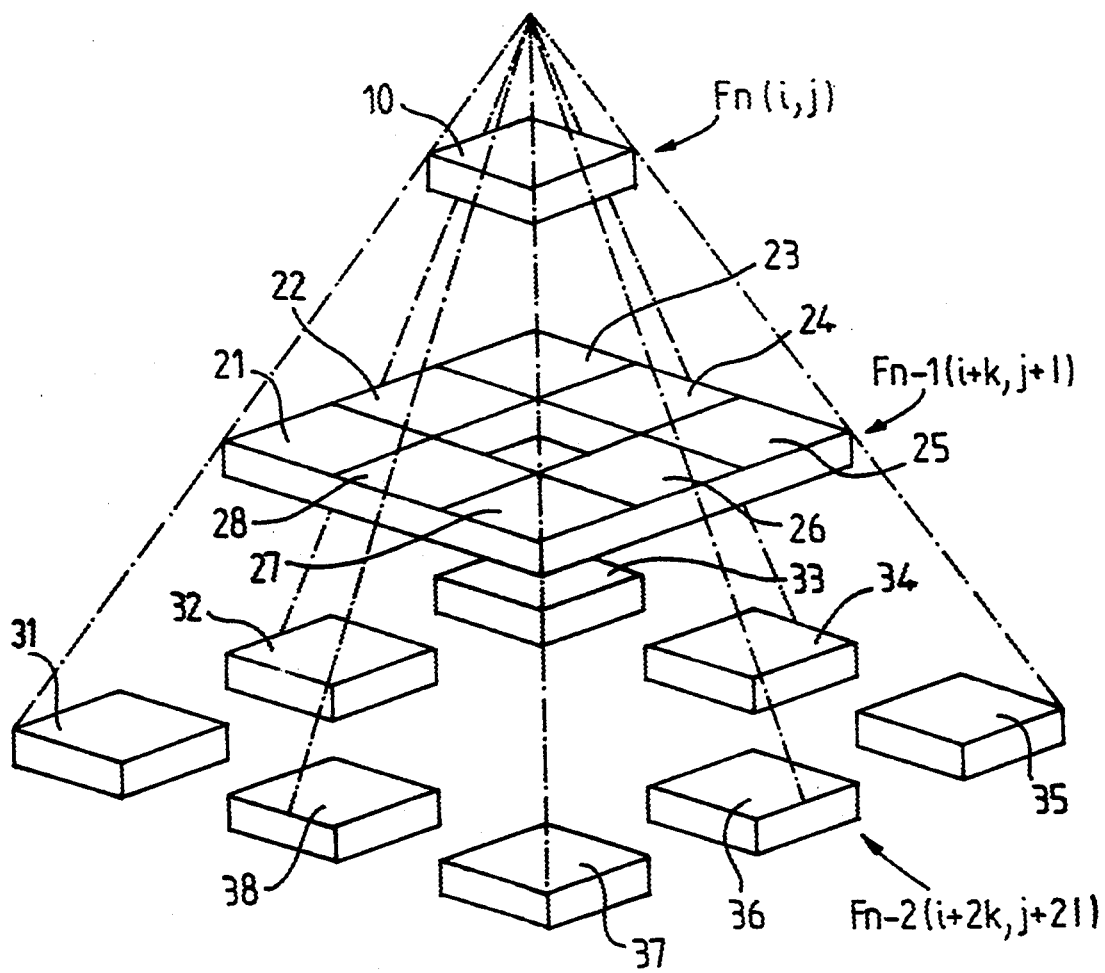
FIG. 1 shows the relationship between pixels of images used by a motion filter in accordance with the invention.

According to the invention, instead of an extraction of 2 images supplying a differential image, as is known from the prior art, a more complete extraction is proposed which involves at least 4 registered consecutive images of a sequence of registered images R, namely:

$R_n$, $R_{n+1}$, $R_{n+2}$, and $R_{n+3}$.

From these registered images R, at least 3 consecutive differential images of a sequence of differential images D are produced in the manner indicated in the following Table I:

TABLE I

| $R_n$ | $R_{n+1}$ | $R_{n+2}$ | $R_{n+3}$ } R |
|---|---|---|---|
| ↓ | ↓ | ↓ | |
| $D_{n+1}$ | $D_{n+2}$ | $D_{n+3}$ | } D |

As is shown in Table I, the registered images $R_n$ and $R_{n+1}$ participate in the formation of the differential image $D_{n+1}$, the registered images $R_{n+1}$ and $R_{n+2}$ participate in the formation of different $D_{n+2}$ and the registered images $R_{n+2}$ and $R_{n+3}$ participate in the formation of differential image $D_{n+3}$. Hence, the first stage of the detection procedure is a stage in which the sequence of differential images D are created.

It is possible to create differential images (a) by subtracting corresponding pixels (i,j) (e.g., $D_n(i,j) = R_{n-1}(i,j) - R_{n-1}(i,j)$) from pairs of images, or using differences in which corresponding pixels from more than two images are combined. Because it is desirable to detect objects, or targets which are bright, against a black, or at least a darker background, no negative values will be used in determining the differential images. This can be achieved by (a) taking (i) the absolute values or (ii) the sum of the squares of the differences used in producing the differential images, or (b) using positive values of the differential images.

The differential images obtained will exhibit higher energy density at the location of moving objects. However, there will also be energy density due to noise for the following reasons:

(a) The noise contained in the original image produces a noise of double the power in the differential image, but its energy density is very low. Consequently a noise is involved which is distributed over the overall differential image.

(b) The registration errors over large low-contrast zones of the background are originally energy concentrations which are not stationary in the course of time. Therefore, it is possible that contributions caused by registration errors become apparent, but these contributions constantly move over the overall image surface.

(c) The registration errors over small contrasted zones of the background produce energy concentrations of relatively stable dimensions whose center of gravity oscillates around a fixed position. If, for example, an object such as a reflection is found in the image, it supplies a concentrated spot, but it may alternatively have a swaying motion in the wind, causing registration errors, which in the difference image produces tracks which oscillate around fixed positions formed by the center of the reflection.

Second Stage

At the end of the operation in the first stage, to provide a perfect validation of the detection, it is necessary to employ a motion filter. According to the invention, the motion filter will utilize at least the 3 differential images $D_{n+1}$, $D_{n+2}$ and $D_{n+3}$ created in the first stage.

It will be demonstrated hereinafter that a method including a motion filter utilizing 3 differential images, as in the method in accordance with the invention, is more advantageous than a method comprising one single extraction in a single differential image followed by a motion filter known from the prior art.

In the method of the invention, the three differential images $D_{n+1}$, $D_{n+2}$ and $D_{n+3}$ will be processed together. In this case, if a target is not very well represented in the differential image $D_{n+1}$, it may be represented to a better degree in at least the differential image $D_{n+2}$, or the differential image $D_{n+3}$.

If an average is taken from $D_{n+1}$, $D_{n+2}$ and $D_{n+3}$, and there is a reasonable probability that the target was poorly represented in one differential image but could be found in the others, that average would allow that target to be detected. This target might have been lost when the prior art method was used.

The motion filter proposed in the second stage makes direct use of the observation that interesting objects will move along approximately linear trails. In this stage the object is to find, in the sequence of differential images D, linear trails which are representative of the moving object.

The motion filter in accordance with the present invention first filters differential images $D_n$, $D_{n-1}$ and $D_{n-2}$ to arrive at filtered differential images $F_n$, $F_{n-1}$ and $F_{n-2}$. That filtering is done by one or more elementary filters having a small support, for example, $3 \times 3$ pixels, whose coefficients will be defined later on. Each pixel (i,j) of each filtered differential image has an intensity (i.e., a grey level) which is obtained by taking the average of the intensity of the pixels in a zone around that pixel in the differential image which was filtered to arrive at that filtered differential image.

The motion filter in accordance with the invention then utilizes pixels from the filtered differential images $F_n$, $F_{n-1}$ and $F_{n-2}$ in performing a second filtering to arrive at a motion filtered image $G_n$. The relationship between the pixels used in obtaining each of the pixels of the image $G_n$ can be viewed as forming a figure in space giving the impression of a pyramid. See FIG. 1. To obtain a pixel (i,j) of the image $G_n$, i.e., $G_n$ (i,j), the following pixels are used:

(a) A single (corresponding) pixel (i,j) of filtered differential image $F_n$ is used. That pixel is denoted $F_n$ (i,j) and is represented in FIG. 1 as cell 10.

(b) 8 pixels from the differential image $F_{n-1}$ are used. The pixels which are used are ones which surround the (corresponding) pixel (i,j) of differential image $F_{n-1}$, i.e., the set of pixels denoted $F_{n-1}$ (i+k,j+l). In FIG. 1, the second level of the pyramid is composed of 8 cells, denoted 21, 22, 23, 24, 25, 26, 27 and 28, which are arranged in a subjacent plane and form a ring around the first cell 10. Those 8 cells represent the set of pixels $F_{n-1}$ (i+k,j+l).

(c) 8 pixels from the differential image $F_{n-2}$ are used. The pixels which are used are ones which partially surround the (corresponding) pixel (i+k,j+l), i.e., the set of pixels denoted $F_{n-2}$(i+2k,j+2l). In FIG. 1, the third level of the pyramid is composed of 8 cells, denoted 31, 32, 33, 34, 35, 36, 37 and 38, which are also arranged in a subjacent plane and form an interrupted ring which is extrapolated from the ring of the second level of the pyramid. Those 8 cells represent the set of pixels $F_{n-2}$ (i+2k,j+2l).

A more detailed description of this second filtration of the motion filter will now be given with reference to FIG. 2, which shows the projections of the pixels of FIG. 1. The center is shown at 10. The first ring is shown at 20, and the second ring is shown at 30. The coordinate axes at i and j motion ending at the center $F_n$ (n,j). All of the possible represent the shifts of the pixels. It will be obvious that the pixels of FIG. 2 defines the 8 positions of the linear purely linearly shifts in three images ending at the center $F_n$ (i,j) are shown. Consequently, if an object to be detected moves in the differential image, it will produce a linear continuous trail which can be found since it will be represented on one of the tracks 1 to 8 shown in FIG. 2.

Tracks 1 to 8 represent the energy tracks. As has been described in the foregoing, it may happen that an image or a target is poorly shown, or that its energy is rather low. Even if the energy is low in the cell 10, it may be higher in the 1st or the 2nd ring. Consequently, by taking the sum of all of these energies, a rather considerable energy will appear at least in one of the directions 1 to 8 of FIG. 2. The 8 directions provide a full coverage of all possible motion directions.

Of course, the method according to the invention is not restricted to 8 directions. More or less directions, evenly spaced over the full ring, may be used to get a coarser or finer coverage. If a range of possible motion directions is known a priori, the directions may be restricted to that range.

According to the invention, the energy in each of the directions will be examined, and a signal will be derived from them, for example, by taking the maximum of these energies. Alternatives, like a sum of the powers of the energies in the respective directions may also be used. The essence is that the motion filter employed is a non-linear filter which emphasizes the maximum energy occurring in one direction. Careful note should be taken of this important feature.

If instead of emphasizing the maximum, one opts for taking the mean of the 8 directions, a very poor result would be obtained in the majority of cases. More specifically, in the case of only one movement in one single direction.

The motion filter used in accordance with the invention is particularly advantageous. That filter clearly discriminates against the noise contributions of the original sequence, simply by the filtering effect. On the one hand, the small-support spatial filtering (for example, $3 \times 3$ pixels) applied to each differential image significantly attenuates the noise. But on the other hand, a filtration in a temporal direction is also effected since 3 elements coming from 3 differential images are added together. Consequently, the filtering operation has a dual effect: it integrates image intensities both spatially and temporally. It is, therefore, suitable to suppress the white noise contributions in an image.

The motion filter also discriminates against the non-stationary contributions of the registration errors. As has been seen in the foregoing, the registration errors over large low-contrast zones of the background are at the basis of energy concentrations which are non-stationary in the course of time. These non-stationary energy concentrations will consequently be disregarded by the temporal filtration feature. Actually, if the energy concentrations over a spatial filtration are considered, it will be found that the noise is not completely attenuated. On the other hand, because these concentrations are non-stationary versus time, taken in the preferred directions defined in the foregoing, the desired attenuation will be obtained. This second noise source is consequently attenuated by temporal filtration.

The motion filter still further discriminates against the quasi-stationary contributions of the registration errors because of its structure, which gives preference to the linear directions. Thus, considering the shifts of the noise contributions which were said to be oscillating, these shifts will occur, for example, between the first and the second ring of the filter and will not reach the third ring (assuming that one limits oneself to motions which oscillate with the maximum amplitude defined by the perimeter of the 2nd ring). Thus, the filter disregards the oscillating motions.

Figure 2:
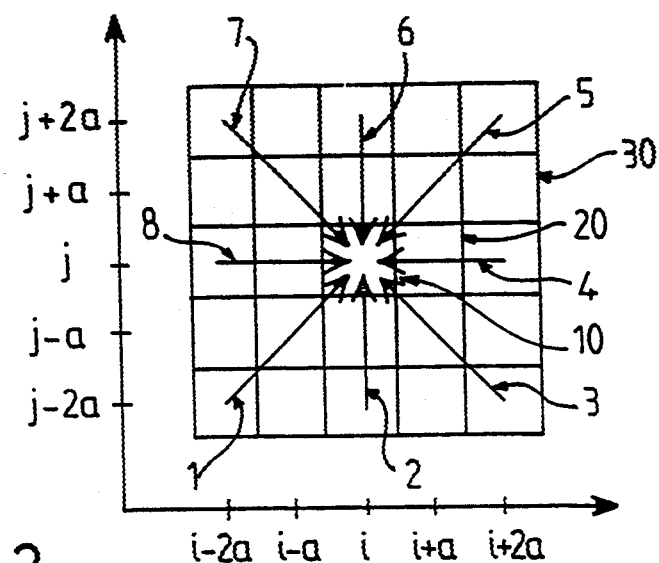
FIG. 2 ms an illustration of the planar projection of the eight possible directions of detectable displacements.

The motion filter described in the foregoing with reference to the FIGS. 1 and 2 will now be formalized.

Already defined are:

R, a sequence of re-adjusted images;

D, a sequence of the inter-image differences such as $D_n(i,j) = R_n(i,j) - R_{n-1}(i,j)$; and $F_n$, the result of a linear filtering operation on $D_n$:

$$F_n(i,j) = \Sigma_{(p,q) \in \text{Support}} \text{Coef}(p,q) D_n(i-p, j-q)$$

The linear filtration operation is a conventional linear filtration operation. The coefficients Coef(p,q), which serve to integrate information from the support (and are, for example, constant over the support) and the size of the support are determined a priori, and depend on the objects one wants to detect. These parameters basically depend on:

the size of the objects to be detected, and the speed of the objects to be detected (the speed being considered relative to the rate at which the camera effecting the sighting is sampled). The support should preferably not be much larger than areas of change between successive sampled images caused by a moving object.

The motion filtering operation described above defines the following non-linear operation for a given pixel (i,j):

$$G_n(i,j) = \max \{F_n(i,j) + F_{n-1}(i+k, j+1) + F_{n-2}(i+2k, j+2l)\},$$

wherein, for selecting the maximum, (k,l) runs through the 8 vectors {a,0}, {a,a}, {0,a}, {−a,a,}, {−a,0}, {−a,−a}, {0,−a}, {a,−a}, i.e., the cartesian product {−a,0,a}* {−a,0,a} except (0,0).

The value of $G_n(i,j)$ is higher when the concentration of positive pixels in at least one direction of linear displacement ending at (i,j) is higher.

An important point to note is that the size of the elementary filtering cells, as well as their spatial distribution, i.e. the parameter a of the function $G_n(i,j)$, defines the interval of speeds over which such a filter can detect objects.

Third Stage

The motion extraction, which must furnish binary information, then involves performing a thresholding operation at the output of the filter Gn constituting a third stage.

Several types of thresholding operations are possible.

First, there is a thresholding operation of the type with a threshold S, where:

$$S = \text{mean} + k^* \sigma,$$

k being fixed and $\sigma$ being defined as the deviation of the type based on the variance of the grey levels, i.e., $$\sigma^2 = \frac{1}{N} \Sigma (I_k - I)^2,$$

where $I_k$ is the set of pixels per grey level and I is the mean.

Figure 3:
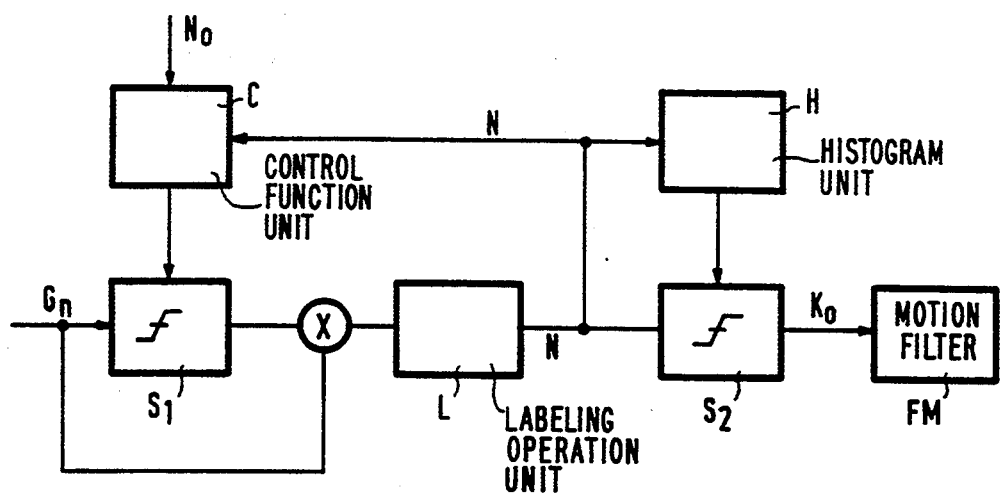
FIG. 3 shows a functional circuit diagram of a thresholding method.

A more elaborate thresholding method, which requires more calculating capacity, but forms a finer and more efficient technique to define the threshold, is described hereinafter with reference to FIG. 3. FIG. 3 shows a functional circuit diagram of a device for implementing this thresholding method.

The method of providing a threshold shown by the device of FIG. 3 acts on $G_n$(supplied by the previously described filter) and starts with a thresholding stage $S_1$ of a known type which initializes the threshold at:

$$S_0 = \text{means} + k^* \sigma.$$

The threshold $S_0$ is chosen at a rather low level, and the thresholding operation $S_1$ is followed by a labelling operation denoted L in FIG. 3. The labelling operation L gives the number N of objects in the image (and their measurements) after the thresholding operation $S_1$.

In the last operation of the method shown by the device in FIG. 3, a motion filter denoted FM is used. The motion filter FM is feed with a constant number of objects $K_0$, where $K_0 < N$. To this effect, the $K_0$ best objects ($N > K_0$) are extracted from the N objects labelled in the labeling operation L to apply the result to the motion filter FM.

In this stage a histogram H of the objects will be examined, i.e., a dimension, either their size, their grey levels or a compromise between their size and grey levels will be defined. The histogram H renders it possible to calculate a threshold $S_2$ so that a constant number of objects $K_0$ to be applied to the motion filter FM is available.

By observing N, at the labelling output, one can retroact on the first threshold $S_1$, by comparing N to $N_0$, $N_0$ being chosen a priori. A simple rule is defined follows:

If $N < N_0$, it is deduced that the number of objects is less than the desired number of objects, and a control function C for decrementing the threshold $S_1$ is acted upon, by providing that $S_1 = S_1 - 1$. If, on the contrary, $N < N_0$, the control function C increments the threshold by providing that $S_1 = S_1 + 1$.

The output value of the control function C is injected into the thresholding function S1 which realizes a control of the threshold so that at the output a number of objects approximating $N_0$ is obtained. It will be noted that this control operation does not require much calculation time. The labelling operation is somewhat longer. It can be effected in a processor. Thereafter, the operation performed on the histogram is very fast because only the objects are considered. It is noted that the control function C is known to a person skilled in the art in the field of numerical control.

Finally, in a three-dimension filter of the type shown in FIGS. 1 and 2, the combination of the sampling rate, the size of the elementary filtering cells and their spatial distribution must be adapted to the speed of the objects which one wants to detect. The sampling rate should not be too high. If the sequence incorporates an object which remains in the first cell of the filter (cell 10), there will be no energy contribution in the 2nd and the 3rd ring. On the other hand, if the sampling rate is too slow an object will move too fast, which does not comply with the overlap hypothesis. That object can first be found in the first cell, whereafter it is lost because it will have passed beyond the third ring between two consecutive images.

In practice, in the tested implementation, square cells of 3×3 pixels were chosen. Such cells define a reasonable (important) speed range which can be worked with in a reasonably easy manner. Other speed ranges can be catered for by using larger or smaller supports.

Alternatively, the method using cells of 3×3 pixels can be applied to spatially sub-sampled images. Motions of a much greater amplitude will then be detected at the same or a lower calculation cost. In this case, it is not necessary to determine the maximum $G_n(i,j)$ for all pixels (i,j), but only a sub-sampled group thereof. Sub-sampling, or other subset selection of the pixels may also be applied if the input image is not sub-sampled when the output image is constructed. This will reduce the amount of work needed to perform the method at the expense of complete coverage. The same method can also be applied to temporally sub-sampled sequences to detect motions of a lesser amplitude at identical costs.

The more extended the object, the more efficient the filtering operation is. In contrast thereto, the filter acts very poorly on a point target as it employs linear filtrations, which have a tendency to erase the point targets.

Figure 4:
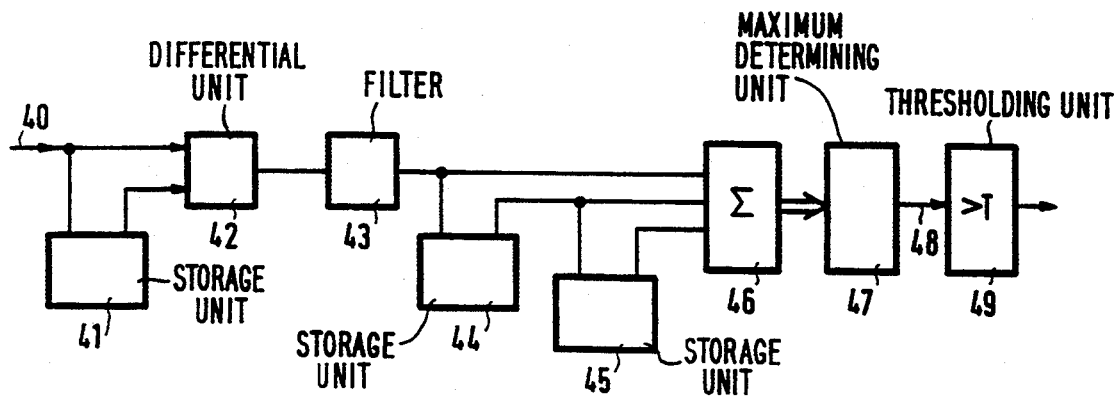
FIG. 4 shows a device for implementing the method in accordance with the invention.

FIG. 4 shows a device for implementing the method according to the invention. This device has an input 40 for receiving the registered images. These images are supplied to a differentiation unit 42, together with a delayed image, which is retrieved from a first storage unit 41 after it has been stored for the duration of one frame. The differentiation unit 42, for example, subtracts its two input images, pixel by pixel, and takes the absolute value of the difference it obtained. The resulting differential image is supplied to spatial filtering unit 43 which output a spatially low pass filtered version of the differential image. This filtered differential image is supplied to a summing unit 46, together with at least two other filtered differential images retrieved from a second and a third storage unit 44 and 45 after they have been stored each for the duration of an image. Hence, three successive images are supplied together to the inputs of the summing unit 46. The summing unit 46 produces for each pixel from the filtered differential image (except possibly some at the edges of the image) a plurality of sum signals, one for each of a plurality of direction as described hereinabove. The plurality of sum signals are supplied to a maximum determining unit 47 which outputs for each pixel a maximum, from among the sum signals supplied to it, at an output 48. As a result an image is produced in which moving objects are emphasized according to the invention. Optionally, the maximum determining unit 46 can be followed by a thresholding unit 49.

The above-described method has been tested on a large number of sequences. The results have clearly shown the superiority of this method over the conventional filtering and inter-image difference thresholding techniques. More specifically, it has shown that a conventional extraction using one single image difference, i.e., differential image, followed by the steps of a path tracking algorithm which integrates the information components contained in 3 consecutive extractions provided performances inferior to those of the extractor in accordance with the invention. The region for this is the fact that in the known method one is forced to take a binary decision, as to the position of the object, which entails loss of information, while in the invention described herein, the information relative to all the grey levels over a depth of at least 3 images is preserved before any decision needs to be taken.

I claim:

1. A method for use in detecting moving targets in a scene, the method comprising:

receiving signals representing a sequence of mutually registered images R ( ..., $R_{n-1}$, $R_n$, $R_{n+1}$, ... ), the registered images R being representative of radiation exiting the scene;

deriving signals representing a sequence of differential images D ( ..., $D_{n-1}$, $D_n$, $D_{n+1}$, ... ) from the signals representing the registered images R;

filtering the signals representing the differential images D to obtain signals representing a sequence of spatially low pass filtered images F ( ..., $F_{n-1}$, $F_n$, $F_{n+1}$ ... ), each of the filtered images F being made up of pixels which each have a position (i,j) in that filtered image and an intensity level; and deriving a signal representing a motion filtered image $G_n$ from the signals representing filtered images $F_{n-m}$, where m ranges from 0 to M, the motion filtered image $G_n$ being made of up of pixels which each have a position (i,j) in the motion filtered image $G_n$ which corresponds to the positions (i,j) in each of the filtered images F, and which each have an intensity level derived by:

(a) summing intensity levels of pixels at respective positions $(i+m \cdot d_x, j+m \cdot d_y)$ in the filtered images $F_{n-m}$ along a selected direction $(d_x,d_y)$, the respective positions lying increasingly further from the position (i,j) in the filtered images $F_{n-m}$ as the filtered images $F_{n-m}$ precede a filtered image $F_n$ in the sequence of filtered images F, to obtain a directional pixel sum, and repeating that process for different selected directions $(d_x,d_y)$; and (b) selecting the directional pixel sum which is largest, and choosing a value representative of that directional pixel sum to serve as the intensity level of the pixel which has a position (i,j) in the motion filtered image $G_n$.

2. The method according to claim 1, wherein the value is the directional pixel sum which is largest.

3. The method according to claim 1, wherein said spatial low pass filtering is performed by a filter having a finite support providing linear filtering.

4. The method according to claim 1, wherein each of the registered images R is made up of pixels which each have a position (i,j) in that registered image and an intensity level, and in deriving the signals which represent the differential images D, the intensity of pixels having the same positions (i,j) in successive images of the registered images R are subtracted from one another to produce substraction results.

5. The method according to claim 4, further comprising taking an absolute value or a square of the substraction results.

6. The method according to claim 1, wherein M is equal to 2.

7. The method according to claim 1, further comprising thresholding the signal representing the image $G_n$ so that each pixel of the motion filtered image $G_n$ is thresholded on the basis of its intensity level.

8. A device for use in detecting moving targets in a scene, the device comprising:

receiving means for receiving signals representing a sequence of mutually registered images R ( ..., $R_{n-1}$, $R_n$, $R_{n+1}$, ... ), the registered images R being representative of radiation exiting the scene;

differential means for deriving signals representing a sequence of differential images D ( ..., $D_{n-1}$, $D_n$, $D_{n+1}$, ... ) from the signals representing the registered images R;

first filter means for filtering the signals representing the differential images D to obtain signals representing a sequence of spatially low pass filtered images F ( ..., $F_{n-1}$, $F_n$, $F_{n+1}$, ... ), each of the filtered images F being made up of pixels which each have a position (i,j) in that filtered image and an intensity level;

second filter means for deriving a signal representing a motion filtered image $G_n$ from the signals representing filtered images $F_{n-m}$, where m ranges from 0 to M, the motion filtered image $G_n$ being made up of pixels which each have a position (i,j) in the motion filtered image $G_n$ which corresponds to the positions (i,j) in each of the filtered images F, and which each have an intensity level, said motion filter means comprising:

(a) summing means for summing intensity levels of pixels at respective positions $(i+m \cdot d_x, j+m \cdot d_y)$ in the filtered images $F_{n-m}$ along a selected direction $(d_x, d_y)$, the respective positions lying increasingly further from the position (i,j) in the filtered images $F_{n-m}$ as the filtered images $F_{n-m}$ precede a filtered image $F_n$ in the sequence of filtered images F, to obtain directional pixel sums; and (b) selection means for selecting that one of the directional pixel sums which is largest and choosing a value which is representative of that one of the directional pixel sums to serve as the intensity level of the pixel having the position (i,j) in the motion filtered image $G_n$.

9. The device according to claim 8, wherein the value wherein said filtering means is a filter having a finite support providing linear filtering.

10. The device according to claim 8, wherein each of the registered images R is made up of pixels which each have a position (i,j) in that registered image, and said differential means is adapted to subtract pixels having the same positions (i,j) in successive images of the registered images R to obtain subtraction results.

11. The device according to claim 10, wherein said differential means is adapted to take an absolute value or a square of the substraction results.

12. The device according to claim 8, wherein M is equal to 2.

13. The device according to claim 8, further comprising thresholding means for thresholding the signal representing the image $G_n$ so that each pixel of the image $G_n$ is thresholded on the basis its intensity level.

* * * * *